(12) United States Patent
Qian et al.

(10) Patent No.: US 11,886,523 B2
(45) Date of Patent: Jan. 30, 2024

(54) MACHINE LEARNING ON SEARCH SESSIONS TO PROVIDE INTELLIGENT SEARCH RESULTS

(71) Applicant: Dell Products L.P., Round Rock, TX (US)

(72) Inventors: Ming Qian, Allston, MA (US); Jaeyoo Jung, Shrewsbury, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 107 days.

(21) Appl. No.: 17/659,750

(22) Filed: Apr. 19, 2022

(65) Prior Publication Data
US 2023/0334104 A1    Oct. 19, 2023

(51) Int. Cl.
*G06F 16/9535* (2019.01)
*G06F 16/953* (2019.01)
*G06F 16/954* (2019.01)
*G06N 20/00* (2019.01)

(52) U.S. Cl.
CPC ........ *G06F 16/9535* (2019.01); *G06F 16/953* (2019.01); *G06F 16/954* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,331,686 B2 * | 6/2019 | Gupta | ................. | G06F 16/2468 |
| 11,249,996 B2 * | 2/2022 | Kussmaul | ......... | G06F 16/24539 |
| 11,526,575 B2 * | 12/2022 | Waterton | ............ | G06F 16/9535 |
| 2020/0159790 A1 * | 5/2020 | Barbosa | ............. | G06F 16/9558 |
| 2022/0100756 A1 * | 3/2022 | Bodigutla | ............. | G06F 16/248 |

OTHER PUBLICATIONS

Zhu, Guangyu & Gilad Mishne, "ClickRank: Learning Session-Context Models to Enrich Web Search Ranking", ACM Trans. Web 6, 1, Article 1 (Mar. 2012), 22 pages. (Year: 2012).*

\* cited by examiner

*Primary Examiner* — Scott A. Waldron
(74) *Attorney, Agent, or Firm* — Workman Nydegger

(57) ABSTRACT

Techniques for training and/or using a machine learning (ML) algorithm to generate search results are disclosed. An ML algorithm is configured (i) to identify a search starting event and a search terminating event for a search session, where the search session includes multiple navigations across multiple different webpages, and (ii) to derive a dynamic score for the search session, where the dynamic score reflects whether the search session successfully identified an end result that was initially unknown at a time when the search starting event occurred. The trained ML algorithm can then be used during later search sessions to promote better search results and help users identify end targets or results in a faster and more intuitive manner.

20 Claims, 12 Drawing Sheets

Search Results
200

*Figure 2*

MACHINE LEARNING ON SEARCH SESSIONS TO PROVIDE INTELLIGENT SEARCH RESULTS

FIELD OF THE INVENTION

Embodiments of the present invention generally relate to improving search results. More particularly, at least some embodiments of the invention relate to systems, hardware, software, computer-readable media, and methods for training and using a machine learning (ML) algorithm to identify correlations between a new search session and previously learned search sessions, where a search session can include multiple navigations across multiple different webpages.

BACKGROUND

A search engine is an application configured to crawl through any number of webpages in an attempt to identify content that matches or aligns with a set of search terms a user enters in a browser. For instance, FIG. 1 shows a browser 100 in which a user has entered a set of search terms 105. The browser 100 represents a client-facing user interface for a search engine 110. The search engine 110 is able to crawl through webpages in an attempt to find webpages having content that matches the user's search terms 105.

To illustrate, in this example scenario, the user has entered "Lightweight Laptops" in the browser 100. In response to those search terms, the search engine 110 can query webpages and return results, such as the search results 200 shown in FIG. 2.

There are various different algorithms used by search engines to identify and provide search results to a user. Despite the widespread prevalence of searching techniques, there are still many areas where the searching techniques can be improved. What is needed, therefore, is an improved technique for identifying relevant search results for a user.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

Figure 2:
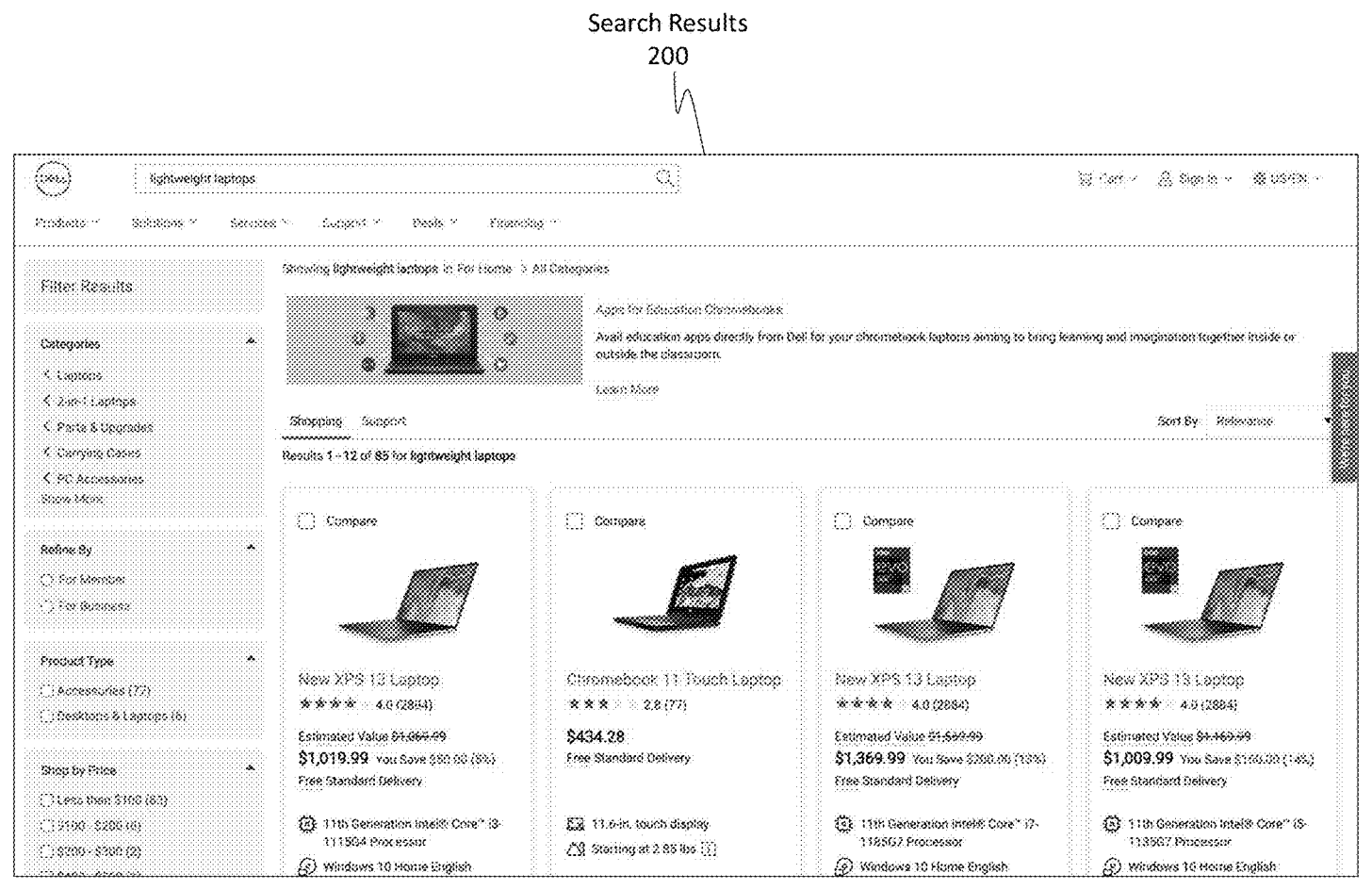

FIG. 2 illustrates examples of various search results that can be provided to a user.

DETAILED DESCRIPTION OF SOME EXAMPLE EMBODIMENTS

Figure 1:
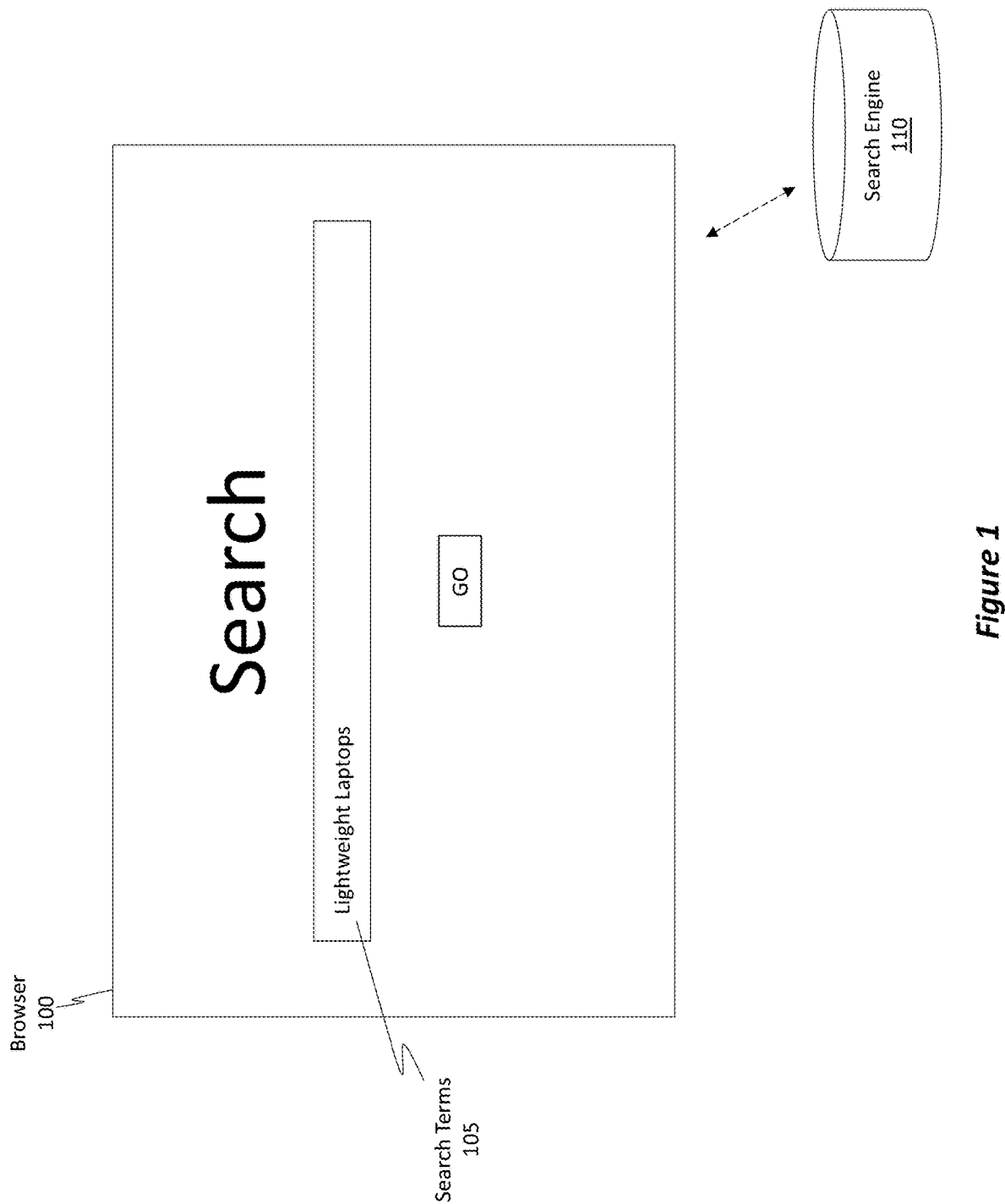
FIG. 1 illustrates an example search browser and engine.

Embodiments disclosed herein relate to systems, devices, and methods for training and/or using a machine learning (ML) algorithm to generate search results.

Some embodiments are directed to training a machine learning (ML) algorithm (i) to identify a search starting event and a search terminating event for a search session, where the search session includes multiple navigations across multiple different webpages, and (ii) to derive a dynamic score for the search session, where the dynamic score reflects whether the search session successfully identified an end result. For instance, the end result can perhaps be the purchase of a product or can perhaps be the identification of specific information the user was searching for (but initially did not know). That is, the end result can be initially unknown (to the ML engine and/or even to the user) at a time when the search starting event occurred.

For instance, some embodiments cause an ML algorithm to identify a search starting event for a search session. The search starting event is identified (i) based on a detection of one or more search terms being entered in a browser to facilitate execution of an initial search or (ii) based on the actual execution of the initial search. Furthermore, a webpage is displayed in the browser in response to the execution of the initial search. After the webpage is displayed, the embodiments cause the ML algorithm to track intermediary events that include multiple navigations to multiple different webpages. A determination is made that the intermediary events are related to the initial search despite the navigations among the multiple different webpages (e.g., even though the user might have left an initial webpage, the subsequent navigations might still be related to the initial search). As a consequence, the search session is configured to include the webpage resulting from the initial search as well as the multiple different webpages resulting from the multiple navigations. After the intermediary events are tracked, the embodiments cause the ML algorithm to identify a search terminating event for the search session. The embodiments also cause the ML algorithm to identify a navigation route that was generated between a time when the search starting event occurred and a time when the search terminating event occurred. The navigation route includes the multiple navigations to the multiple different webpages. The embodiments cause the ML algorithm to determine an outcome of the search session. Based on the determined outcome, the embodiments cause the ML algorithm to derive a dynamic score for the navigation route of the search session. The dynamic score reflects a quantitative confidence as to whether the search session resulted in successful identification of an end result that was initially unknown at the time when the search starting event occurred.

Some embodiments are configured to use a trained machine learning (ML) algorithm that has been trained to identify correlations between a new search session and previously learned search sessions in order to provide refined search results for the new search session, where the refined search results are designed in an attempt to reduce a number of webpage navigations that will potentially be performed during the new search session and where the refined search results are generated based on webpage navigations that were tracked as parts of the previously learned search sessions.

For instance, some embodiments detect a search starting event for the new search session. The search starting event is identified (i) based on a detection of one or more search terms being entered in a browser to facilitate execution of an initial search or (ii) based on the actual execution of the initial search. The embodiments cause the trained ML algorithm to attempt to identify correlations. In some cases, the correlations include correlations between (i) the one or more search terms and (ii) one or more previous navigations between various webpages, where the one or more previous navigations were tracked as parts of the previously learned search sessions. In some cases, the correlations further include correlations between characteristics of a user who is conducting the new search session and characteristics of users who conducted the previously learned search sessions. The embodiments generate a set of search results based on the one or more search terms and further based on a set of correlations identified by the trained ML algorithm. Based on new data collected during the new search session (e.g., perhaps navigations to other webpages), the embodiments cause the ML algorithm to further generate search results that are generated based on one or more new correlations that are identified by the trained ML algorithm.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, advantages, and practical applications to the technical field of designing and implementing searching algorithms. As an example, the embodiments employ the use of an ML algorithm to identify search results that are likely more relevant to what a user is searching for. Traditional searching techniques are very limited in that the search session was traditionally limited to a single search instance. The disclosed embodiments, on the other hand, expand on the concept of a search session and enable a search session to include multiple search instances and even multiple navigations across multiple different webpages. In some implementations, the search session can even include navigations across different webpage domains. In this sense, the embodiments greatly expand the ability to understand a user's actions and to generate results that are likely more relevant for a user.

By performing the disclosed principles, one will appreciate how even the operations of a computer system are improved. For instance, it was previously the case that large amounts of resources would be consumed (for potentially prolonged time periods) when a user conducted a search because it was often the case that it would take numerous searching operations for a user to eventually find what that user was looking for. Because the embodiments incorporate ML intelligence into the searching process, the efficiency of the computer can be improved by providing pinpoint, targeted search results, where those search results are likely more relevant to whatever the user is searching for.

By way of further clarification, it usually takes customers more than one search attempt to get to what they are searching for on a website or a console. The existing search analytics and natural language processing are focused on evaluating a single search attempt and not evaluating the entire search route. The disclosed embodiments beneficially focus on capturing the multiple search-attempts, documenting the search routes, and assigning a unique numerical and dynamic scoring value for the users' different routes through machine learning. This numerical and dynamic scoring can help identify error routes and success routes. These scores can also lead to improved use of the searching tool and to even potentially increase the overall search-to-end result success rate.

The disclosed numerical and dynamic scoring can effectively derive which search route is more likely to lead to a successful outcome. The artificial intelligence in the back-end can understand the commonality of the success routes (e.g., a customer successfully identifies a target result, such as perhaps by making a purchase) and the error routes (e.g., a customer does not find the target result, such as by not making a purchase or by exiting the page). This information can help the ML algorithm to analyze the customer's search intent as well as help the ML algorithm improve the search results (e.g., navigations/routes guidance for the user) of the search tool to ultimately increase the overall search-to-end result success rate. Accordingly, the remaining portions of this disclosure will describe in detail how these benefits are achieved as well as numerous other benefits.

Example Methods for Training an ML Algorithm

One of the issues with traditional searching techniques is that because the searching tools do not understand a customer's (i.e. user's) search intent, those tools typically offer (at least initially) the wrong search results to the customer. This condition leads to lower satisfaction on the user end and potentially losses on the developer's end (e.g., perhaps a loss of sales).

For instance, assume the customer wants to find a personal use laptop that is small and light weight. The user might also want a laptop that meets some gaming needs on an occasional basis. The customer might navigate to a webpage and type "Lightweight Laptops" in the search bar. As discussed previously, various search results may be displayed.

The customer might scroll through the pages, browse a bit, and then click into a specific laptop's webpage to review that laptop's details. The customer might not be sure if this laptop will meet his/her needs for occasional gaming. The customer then types in the search bar "gaming laptops" to try to include his/her gaming needs in the search term. However, it is often the case that the search engines would show only the gaming laptops and not consider the previous search for "lightweight laptops". Some search engines that even have problems with natural language processing would show numerous computing accessories and perhaps might not show laptops. The customer would clearly be disappointed and frustrated with those search results that do not reflect what the customer is looking for which is a "lightweight gaming laptop", and the customer might leave the website without purchasing anything. Thus, the webpage owner would lose a potential sale and a potential customer. This incident could also leave the customer a terrible impression of webpage and the corresponding brand image.

From the above example, one will appreciate how the existing tools and analytical search tracking techniques do not have a clear beginning and end point because users could have multiple distinct actions during a search session, including but not limited to, clicking, scrolling, searching, and sharing. That is, users could be conducting multiple actions that all relate to one search intent/search session; however, traditional techniques failed to aggregate or compile those multiple actions together in a way to distill the user's search intent.

Stated another way, existing search intent analysis results were not looped back to the next immediate search interaction that a customer has with a webpage. That is, with the same search keywords/terms in the search bar, different customers would receive the exact same search results with no customization of the search results based on the specific customer's characteristics. Such techniques often led to sale losses due to a lack of understanding of the customers and due to a lack of dynamic change in the search results that match with the customers' characteristics.

The disclosed embodiments, on the other hand, are able to track an end-to-end search session and provide updated or refined search results based on actions that are tracked throughout the entire search session. For example, the disclosed embodiments utilize metadata to define when a search session begins and when that search session ends. This search session might include any number of navigations through any number of different webpages, which is in contrast to traditional search analytic techniques. The embodiments capture search session information and search routes (aka navigations) that a user might take while searching for an item. The embodiments also beneficially employ a machine learning engine and a neural network to find commonalities and clusters among the different search routes. The machine learning engine can assign a unique and dynamic score for each search route. The dynamic score and feedback can be used to influence subsequent searches for the same customer or for future customers. The dynamic score and feedback could also influence the subsequent search results for the same customer in real time.

Accordingly, the following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
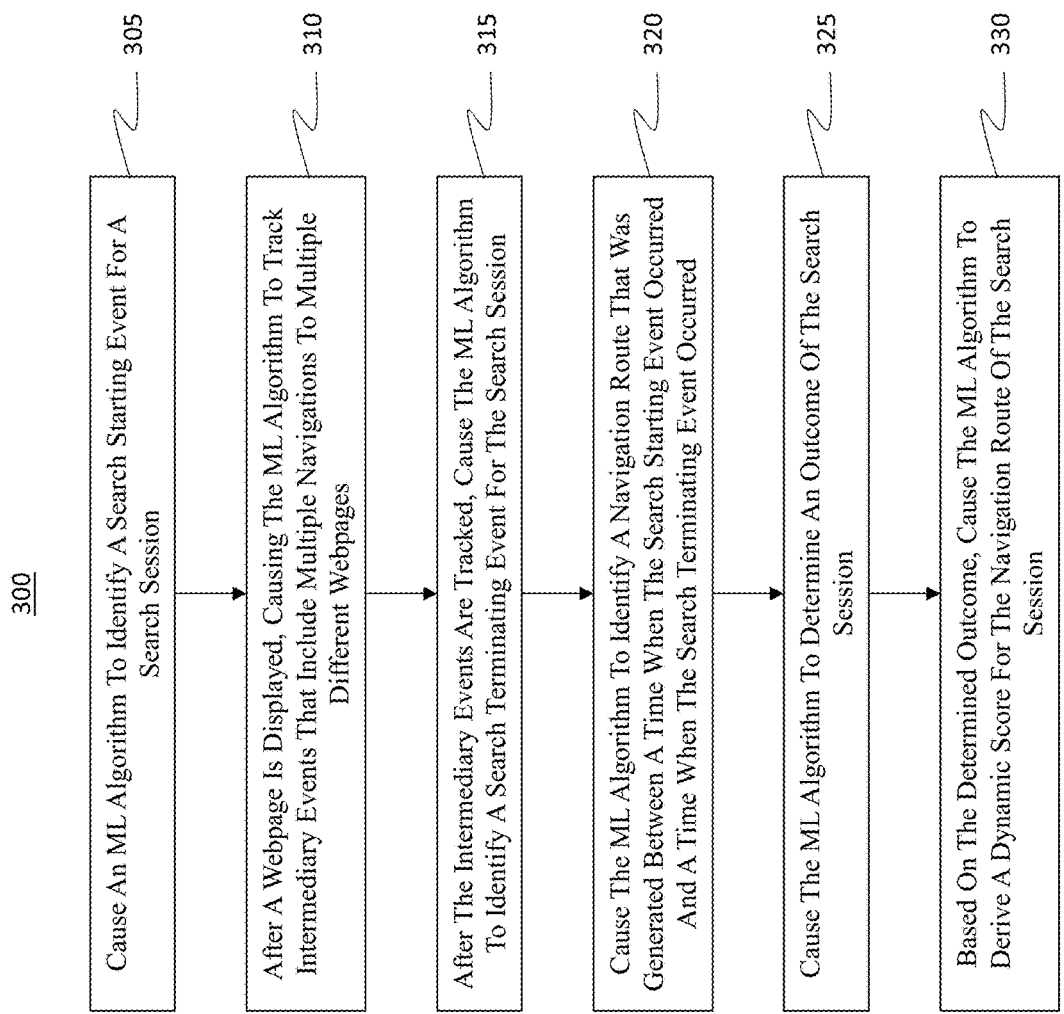
FIG. 3 illustrates a flowchart of an example method for training an ML algorithm.

Having just described some of the issues with the traditional technology as well as some of the benefits provided by the disclosed embodiments, attention will now be directed to FIG. 3, which illustrates a training method 300 for training a machine learning (ML) algorithm. The training is performed to enable the ML algorithm (i) to identify a search starting event and a search terminating event for a search session, where the search session includes multiple navigations across multiple different webpages, and (ii) to derive a dynamic score for the search session, where the dynamic score reflects whether the search session successfully identified an end result that was initially unknown at a time when the search starting event occurred. Examples of a positive end result include the purchase of a product, the identification of specific information, the sharing of a link, and so forth. Examples of a negative end result include the closing of a browser (without identifying a positive end result), ignoring the browser, or clicking away from the browser. Of course, other types of end results can be identified as well. FIGS. 4, 5, 6, 7, 8, and 9 provide additional information regarding the method acts of method 300, so frequent reference to those figures will be made in this section as well.

Method 300 includes an act (act 305) of causing an ML algorithm to identify a search starting event for a search session. Notably, the search starting event is identified (i) based on a detection of one or more search terms being entered in a browser to facilitate execution of an initial search or, alternatively, (ii) based on the execution of the initial search. A webpage is displayed in the browser in response to the execution of the initial search. The webpage can include any number of search results that are related to the search terms entered in the browser.

Figure 4:
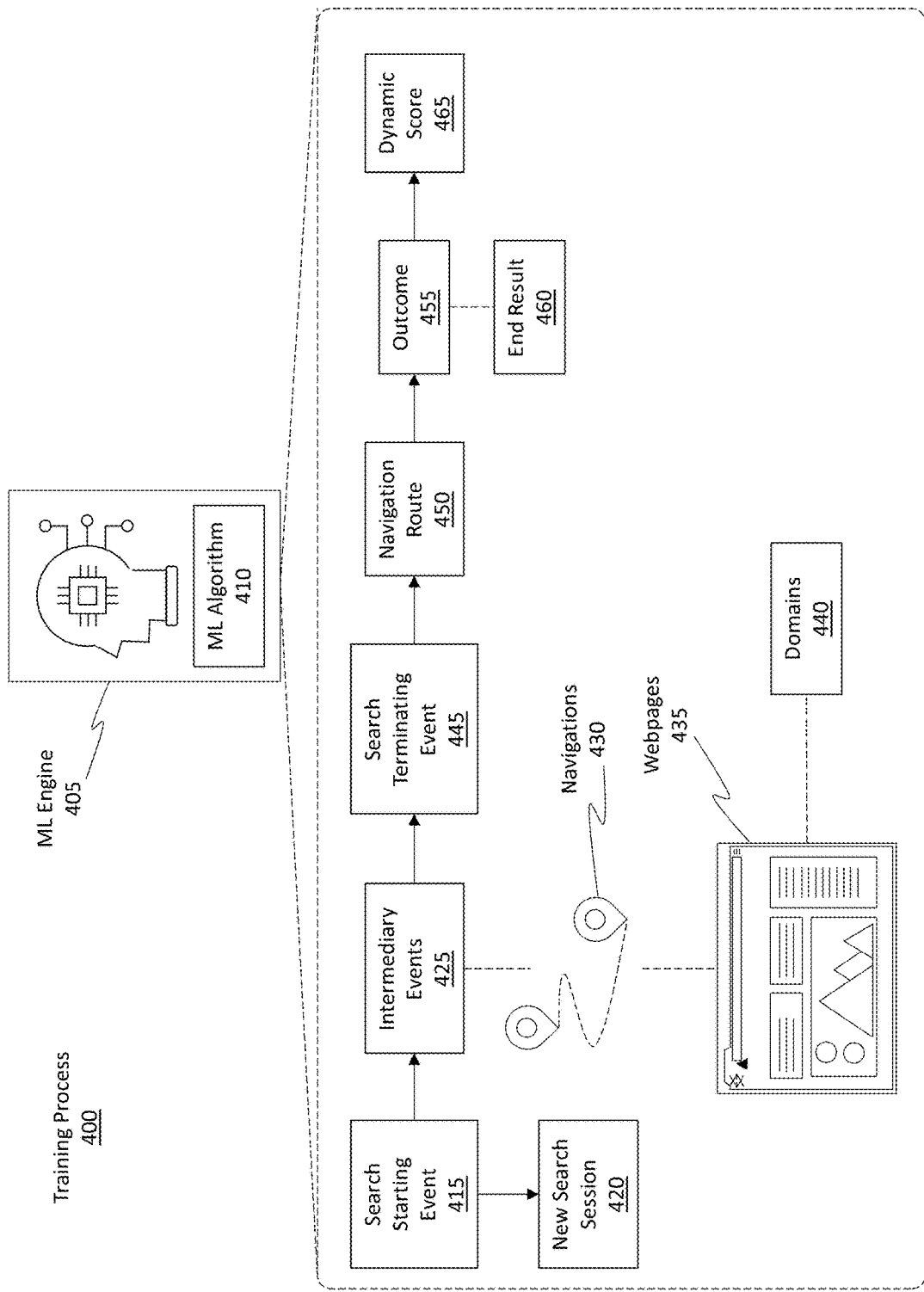
FIG. 4 illustrates a process flow of the training process.

FIG. 4 provides some additional details. Specifically, FIG. 4 shows a training process 400 in which an ML engine 405 is able to execute an ML algorithm 410. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The ML engine 405/algorithm is able to identify a search starting event 415. This starting event indicates that a new search session 420 is beginning. As mentioned previously, the search starting event 415 can be triggered when a user enters search terms into a browser and/or when a search is initiated based on those search terms.

Returning to FIG. 3, after the webpage is displayed, act 310 includes causing the ML algorithm to track (as part of the training process) intermediary events that include multiple navigations to multiple different webpages. As will be described in more detail later, intermediary events can include any action on the user's part with regard to the computer system. As examples only, the intermediary events can include navigations performed by the user to various webpages, clicks on a webpage, scrolling actions, time spent on a particular webpage, the location of the cursor, and so on.

A determination is made that the intermediary events are related to the initial search despite the navigations to the multiple different webpages. That is, a traditional search session would be terminated when a user navigated away from the initial webpage. In contrast, the disclosed embodiments incorporate navigations to new webpages in the same search session. As a result, the search session is configured to include the webpage resulting from the initial search as well as the multiple different webpages resulting from the multiple navigations. A "navigation" or a "route" can include these webpages.

FIG. 4 shows how the ML engine 405 is able to track various intermediary events 425. For instance, the intermediary events 425 can include navigations within a single webpage and/or navigations among multiple webpages, as shown by the navigations 430 and the webpages 435. In some cases, the navigations can include navigations among webpages that belong to different domains 440. Stated differently, the multiple navigations to multiple different webpages can optionally include navigations to webpages having different domains.

Figure 5:
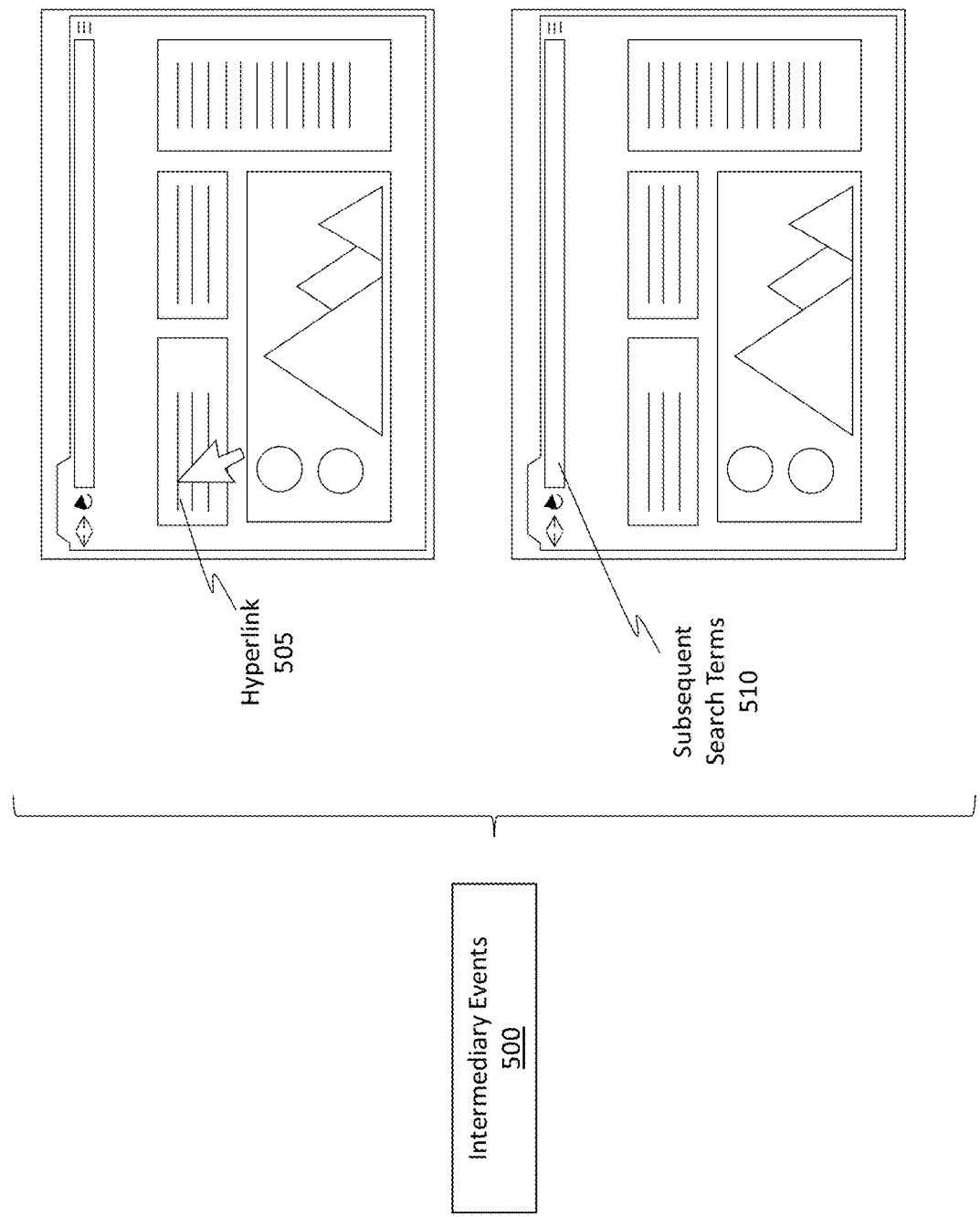
FIG. 5 illustrates various features of intermediary events.

In some cases, the intermediary events are determined to be related to the initial search based on one or more conditions. These conditions can include a condition where a hyperlink within a webpage is selected, and the selection results in a different webpage being displayed. This new webpage is related to the previous webpage via the hyperlink. To illustrate, FIG. 5 shows intermediary events 500, which are representative of the intermediary events 425 of FIG. 4. In one example scenario, the intermediary events 500 include the selection of a hyperlink 505, as described above.

Another condition can include a condition where subsequent search terms are used during one or more subsequent searches. Here, these subsequent search terms might include one or more common search terms that were included in the search terms that were originally entered in the browser in order to facilitate the initial search. Additionally, or alternatively, synonyms or related words can be used and can be tracked. Of course, other conditions might exist to reflect a relationship between intermediary events and the original search. FIG. 5 shows how the intermediary events 500 can further include the detection of subsequent search terms 510, as described above.

After the intermediary events are tracked, act 315 of FIG. 3 includes causing the ML algorithm to identify a search terminating event for the search session. To illustrate, FIG. 4 shows how the ML engine 405 is able to identify the search terminating event 445.

Figure 6:
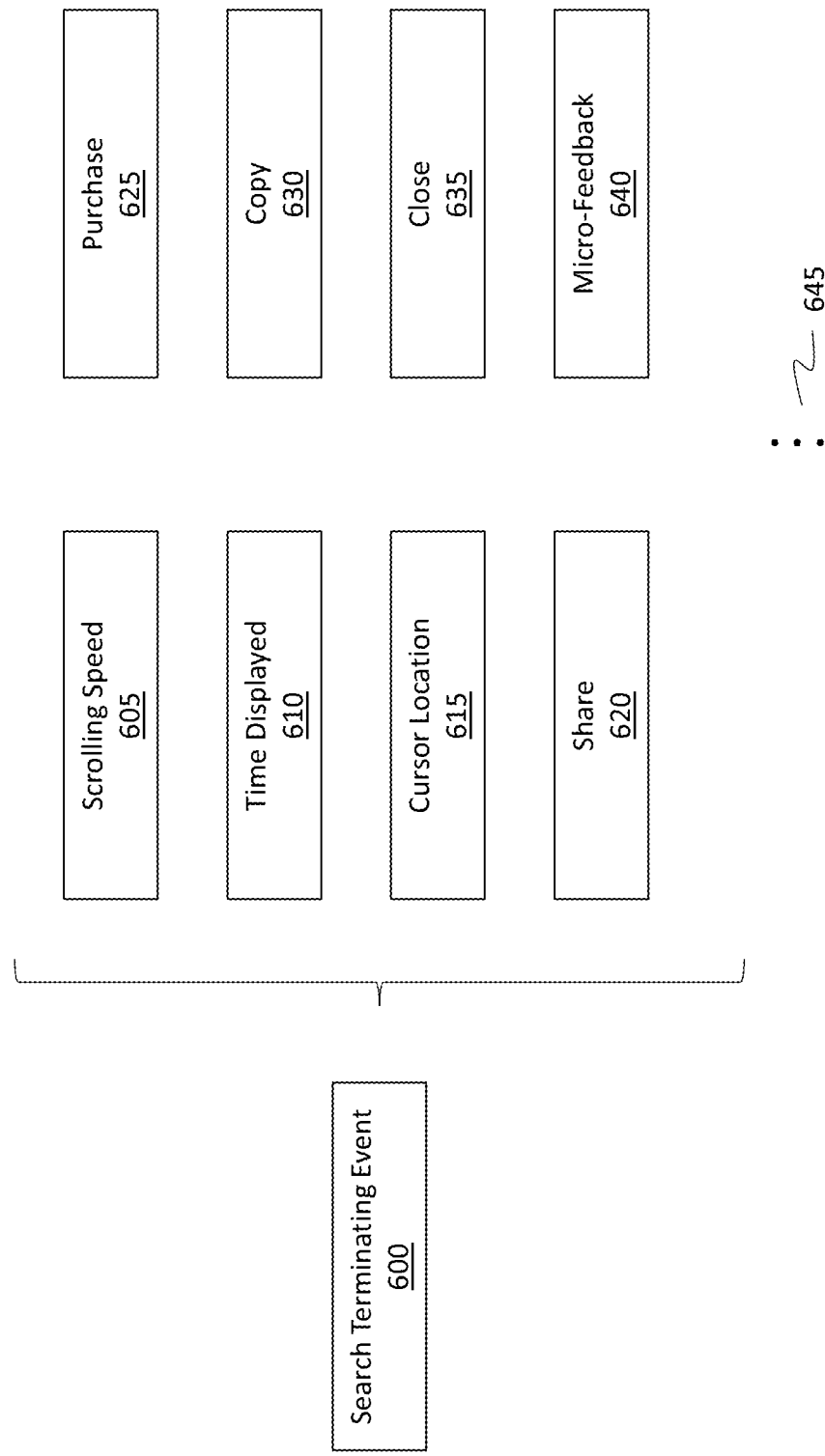
FIG. 6 illustrates examples of what can be used to determine whether a search terminating event has occurred.

The search terminating event 445 can be identified in various ways, or in combinations of various ways. For instance, as illustrated in FIG. 6, the process of identifying the search terminating event 600 for the search session can optionally include identifying one or more of the following: (i) a scrolling speed 605 used while a particular webpage is being displayed; or (ii) an amount of time that the particular webpage is being displayed 610; or (iii) a location 615 of a cursor relative to the particular webpage; or (iv) an event in which the particular webpage is shared 620; or (v) an event in which a product displayed in the particular webpage is purchased 625; or (vi) an event in which text that is displayed in the particular webpage is copied 630; or (vii) an event in which the browser is closed 635. The search terminating event 600 can also be identified based on micro-feedback 640 received from a user who is conducting the search session. Even the number of clicks a user makes using his/her cursor can be monitored and collected by the ML algorithm. The ellipsis 645 indicates that other conditions can also be monitored to identify the search terminating event 600.

By way of further details, if the scrolling speed is below a particular threshold, then the embodiments may determine that the user is actively studying the contents of the webpage. On the other hand, if the scrolling speed exceeds the threshold, then the embodiments may determine the user is no longer actively focusing on the webpage. Similarly, if the amount of time the webpage is displayed exceeds a threshold, then the embodiments may determine that the user has found what he/she is looking for. If the location of the cursor is located outside of the webpage (or at a location where content is not being displayed within the webpage), then the embodiments may determine that the user is no longer interested in the search. If the user shares a link to a webpage, then that action might also indicate that the user found the content needed and the search is over. Similarly, if text is copied, then that action might indicate that the search is over. Further, if the browser is closed, then the search is likely over. Combinations of these and other aspects can indicate to the ML engine 405 that a search session might be over. As mentioned previously, the search session might have occurred over numerous different webpages.

Figure 7:
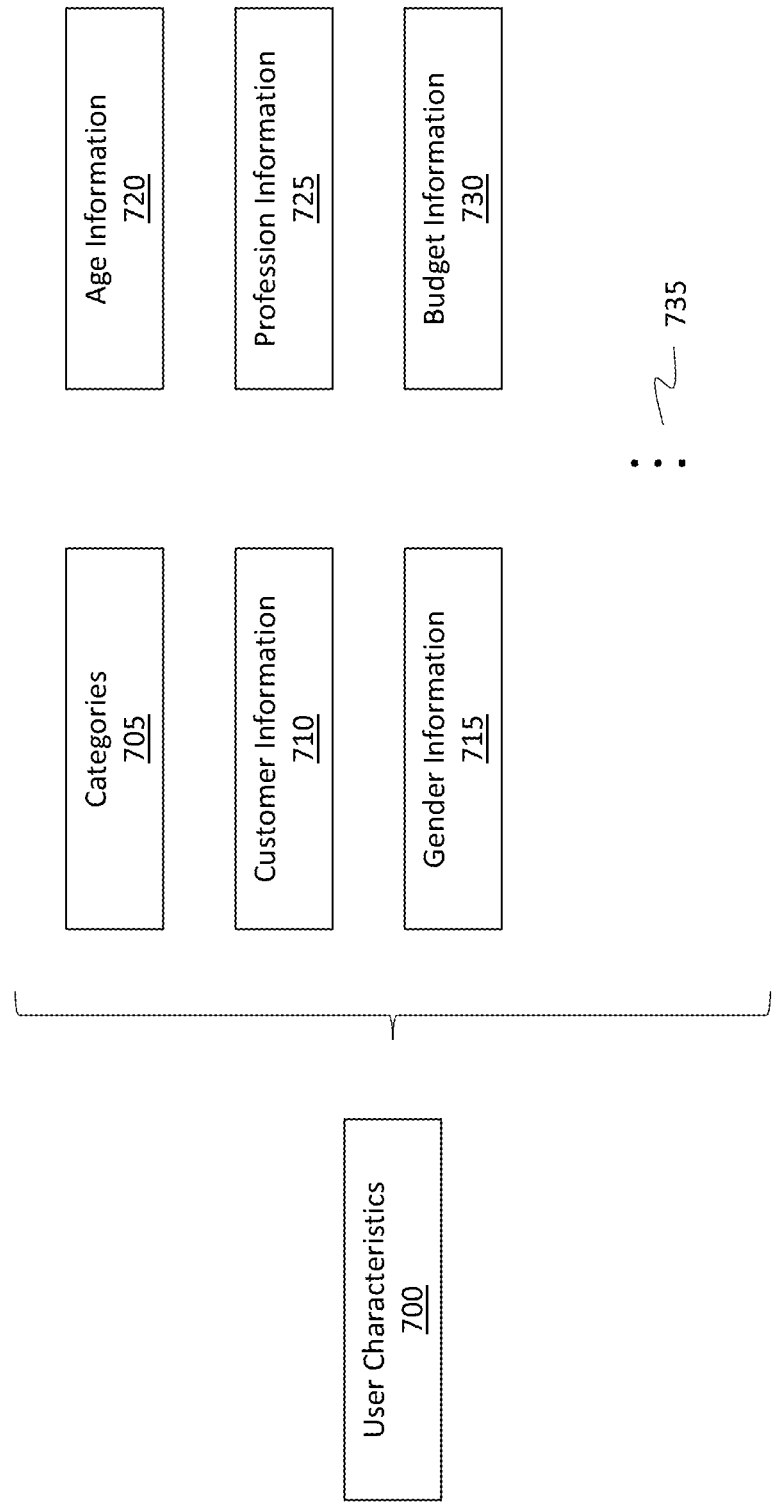
FIG. 7 illustrates examples of various user characteristics that can be examined.

In some cases, the ML algorithm/engine can further learn characteristics of a user who is conducting the search session. For instance, if the user is logged in via a profile, then the contents of the profile can be examined to determine characteristics about the user. If the user is not logged in (e.g., perhaps the user is currently anonymous), then the computer's cookies can optionally be examined in an effort to learn information about the user. Similarly, information included on the user's device can also optionally be examined to learn information about the user. FIG. 7 provides additional details.

FIG. 7 shows various user characteristics 700 that the ML engine 405 of FIG. 4 can attempt to identify about the user to help identify and refine search results. That is, the ML algorithm can collect additional data during a search session, and the additional data (e.g., the user characteristics 700) can include one or more of: (i) categories 705 that the user frequently looks up or is currently looking up; or (ii) customer identification information 710 (e.g., name, residence, etc.); or (iii) customer gender information 715; or (iv) customer age information 720; or customer profession information (725); or customer budget information 730. The ellipsis 735 indicates how other information about the customer/user can also be identified. These data can be used by the ML algorithm to improve what set of search results are provided to the user.

Returning to FIG. 3, act 320 includes causing the ML algorithm to identify a navigation route (i.e. the traversals between the various webpages) that was generated between a time when the search starting event occurred and a time when the search terminating event occurred. The navigation route includes the multiple navigations to the multiple different webpages. FIG. 4 shows how the ML engine 405 can identify a navigation route 450.

Act 325 of FIG. 3 includes causing the ML algorithm to determine an outcome of the search session. For instance, FIG. 4 shows how the ML engine 405 is able to identify the outcome 455, which can further include the identification of an end result 460. Notably, this end result 460 was not known when the search session initially began. For instance, the user may not have known the specific product he/she was searching for when the search session began. As mentioned previously, however, the end result need not be a specific product. Indeed, the end result can even be information or data the user is searching for.

Based on the determined outcome (e.g., regardless of whether the outcome was positive or negative), act 330 includes causing the ML algorithm to derive a dynamic score (e.g., dynamic score 465 of FIG. 4) for the navigation route of the search session. The dynamic score reflects a quantitative confidence as to whether the search session resulted in successful identification of an end result (e.g., end result 460 of FIG. 6) that was initially unknown at the time when the search starting event occurred. Higher scores indicate that a successful outcome was identified (e.g., the user found the product he/she was searching for) while lower scores indicate that a failed outcome was identified (e.g., the user did not find what he/she was looking for). Notably, the ML engine 405 of FIG. 4 can be trained on any amount of data, including any number of search sessions.

Accordingly, the beginning of a search session is typically identified when a user conducts a search via a search bar. The end of a search session is identified as either an exit (e.g., a failed end result) or found/purchase event (e.g., a successful end result). The exit result can include a scenario where the user exits out of a webpage. The found/purchase event can include a scenario where the user stayed on a webpage for more than X minutes (e.g., the X amount of time can be calculated and suggested based on an historical data analysis associated with a user, such as how long does the user frequently stay on webpages) with clicks and scrolling behavior or has finished a purchase on the website.

All the search sessions and individual navigations (aka routes) can be captured and analyzed by the machine learning algorithm. Each customer's search session/routes will be captured by the ML engine. The ML engine processes all the routes and clusters the routes based on commonalities. The types of clustering include, but certainly are not limited to: (i) customer grouping/clustering (i.e. commonalities identified based on user characteristics); or (ii) results grouping/clustering (i.e. commonalities identified based on similar end results); or (iii) machine learning (neural network) unique clustering (i.e. other commonalities identified by the ML algorithm). Other types of clustering can include seasonal groupings (e.g., searches associated with specific seasons, such as Fall, Winter, Spring, Summer, baseball season, football season, etc.) or any other event-related groupings.

With all these clusters and groupings, an evaluated route score (i.e. the dynamic score) will be computed and assigned to the identified route. This score and the different clusters' data can be used to analyze the next search interaction from a new customer or an existing customer or even for the current customer. Consequently, when a new customer or an existing customer starts their search, the ML engine can operate in the backend and can understand this customer's profile. The ML engine can then match that profile with the known historical routes and clusters from other users. The ML engine will then improve the search results for that particular customer based on the known information and different clusters' commonalities.

For instance, if that customer is considered to be a part of an "impatient shopper" cluster, an identified search route can be identified, where this search route has a predicted success rate of 80% for leading to a positive end result (e.g., perhaps the purchase of a product). The disclosed principles will help to ultimately increase the search-to-end result success rate and will improve the overall searching performance.

Figure 8:
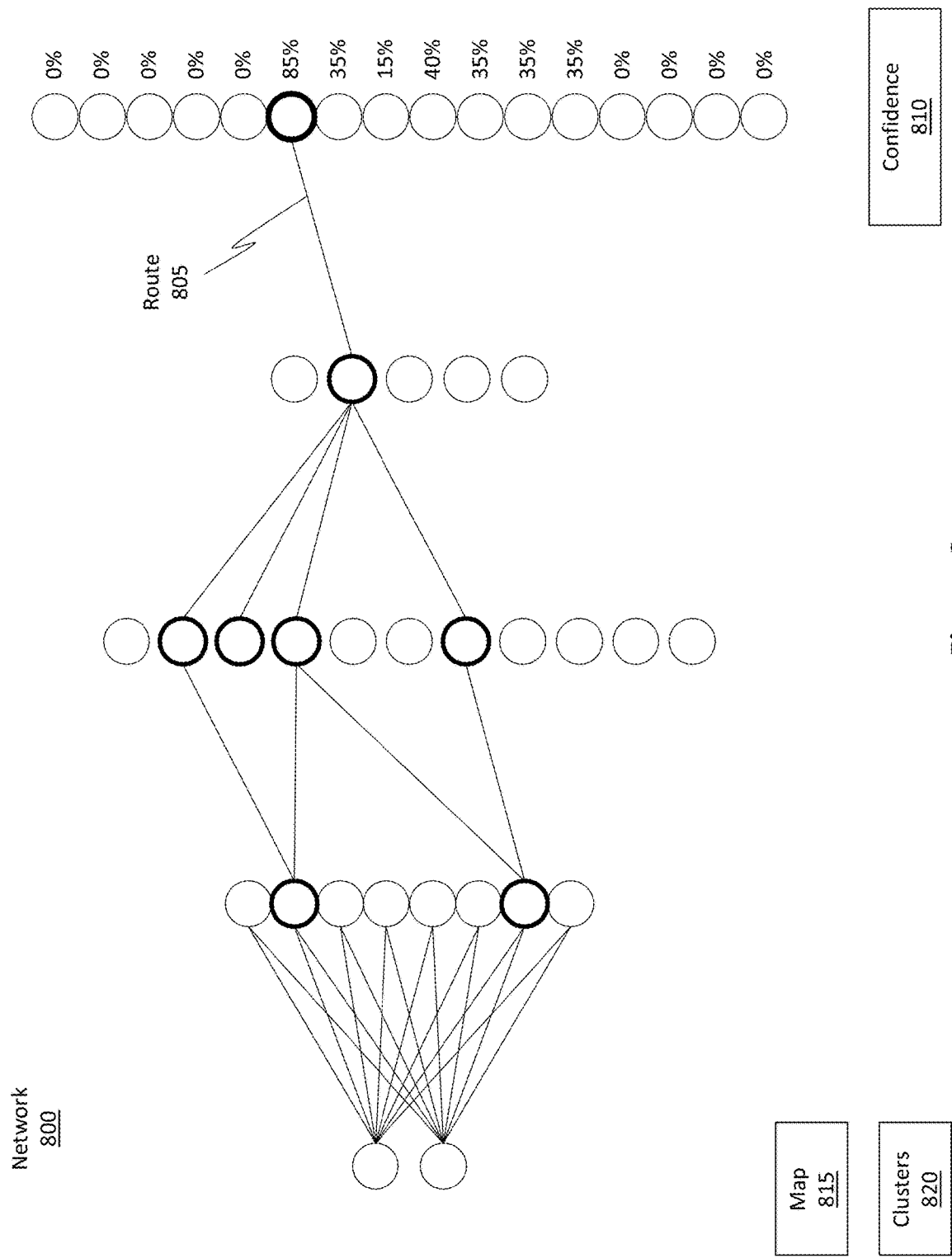
FIG. 8 illustrates an example neural network.

The entire process and its algorithms can optionally utilize a Sigmoid/Logistic Activation Function. This function can help provide the normalization process which could be activated to derive the normalized numbers. For instance, the beginning of the search can be classified as the starting node/neuron. The second search with a failed result can be another neuron. The process will connect the two neurons (as a sequence) along with other parameters (neurons) such as, the time spent (neurons) to provide an unique sequence in order for further normalization. FIG. 8 provides a useful illustration.

FIG. 8 shows a network 800, which can be implemented by the ML engine 405 of FIG. 4. The network 800 can represent or can include the Sigmoid/Logistic activation function mentioned above. For instance, the network 800 can include various nodes (e.g., the circles) and links between those nodes. The beginning of the search can be represented by the nodes at the far left of the network 800. Various intermediary navigations or searches are represented by the middle circles. The far right circles represent various outcomes/end results. The embodiments are able to identify a route 805 based on various characteristics, where this route 805 will likely lead to a successful outcome, based on computed (ML learned) confidence 810 levels. In the scenario shown in FIG. 8, the route 805 has an 85% likelihood of leading to a successful outcome for a particular user. Additionally, the ML engine is able to generate a neural map 815 or perhaps a heat map that can optionally show various clusters 820 of commonalities between attributes. That is, the ML algorithm can learn on multiple search sessions, and the ML algorithm can perform a clustering process to generate a map that identifies relationships between attributes of the multiple search sessions. With the ML algorithm now trained, the embodiments can apply that trained ML algorithm to new search sessions.

Example Methods for Using a Trained ML Algorithm

Figure 9:
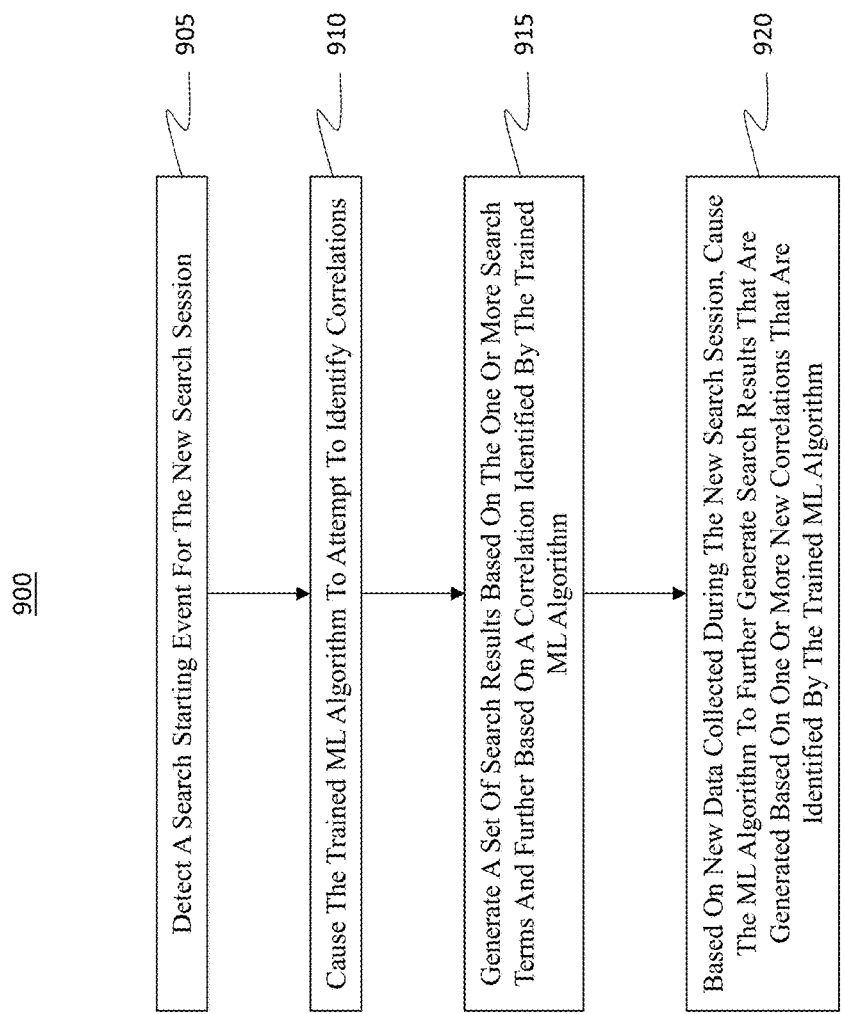
FIG. 9 illustrates a flowchart of an example method for using a trained ML algorithm to provide a set of improved search results to a user.
Figure 10:
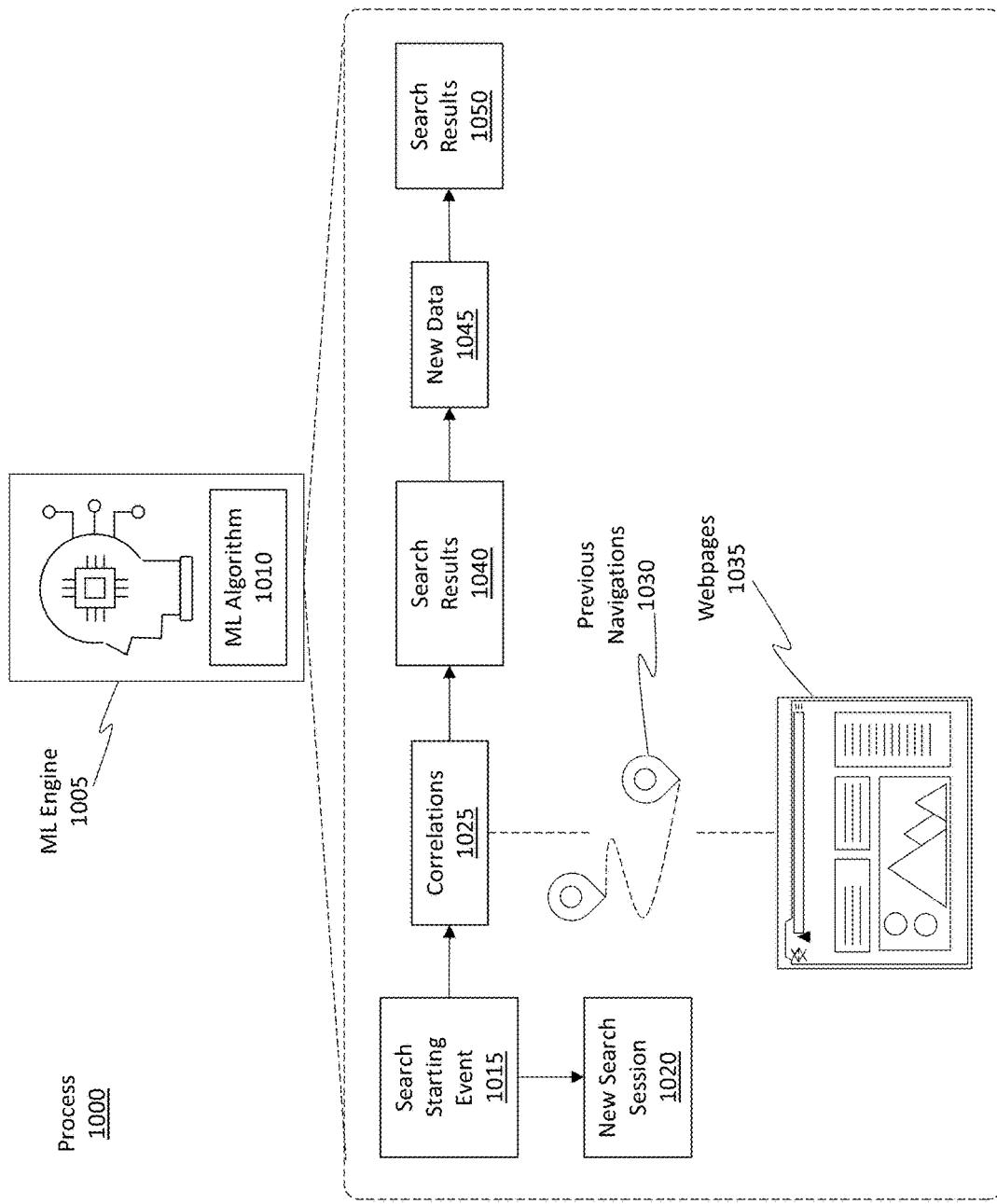
FIG. 10 illustrates an example process flow where the trained ML algorithm provides the improved search results.

Attention will now be directed to FIG. 9, which illustrates a flowchart of an example method 900 for using a trained machine learning (ML) algorithm. This ML algorithm has been trained to identify correlations between a new search session and previously learned search sessions to provide refined search results for the new search session. The refined search results are designed in an attempt to reduce a number of webpage navigations that will potentially be performed during the new search session. Further, the refined search results are generated based on webpage navigations that were tracked as parts of the previously learned search sessions. The ML algorithm discussed in FIG. 9 can be the trained ML algorithm 410 of FIG. 4. FIG. 10 will frequently be referenced in connection with FIG. 9.

Method 900 includes an act (act 905) of detecting a search starting event for the new search session. As before, the search starting event is identified (i) based on a detection of one or more search terms being entered in a browser to facilitate execution of an initial search or (ii) based on the execution of the initial search.

For instance, FIG. 10 shows a process 1000 in which a ML engine 1005, which includes an ML algorithm 1010, is able to detect a search starting event 1015, which indicates the start of a new search session 1020. The ML engine 1005 and the ML algorithm 1010 are representative of the ML engine 405 and ML algorithm 410, respectively (but now in a trained state).

Act 910 includes causing the trained ML algorithm to attempt to identify correlations. In some implementations, the correlations include correlations between (i) the one or more search terms and (ii) one or more previous navigations between various webpages, where the one or more previous navigations were tracked as parts of the previously learned search sessions. For instance, based on the search terms, the embodiments attempt to identify related search terms and navigations. The resulting information will be used to provide intelligently selected search result to the user.

In some implementations, the correlations can further include correlations between characteristics of a user who is conducting the new search session and characteristics of users who conducted the previously learned search sessions. In some cases, the user is a known user (e.g., one who has a profile) while in other cases the user is an anonymous user (e.g., one who does not have a profile).

Figure 11:
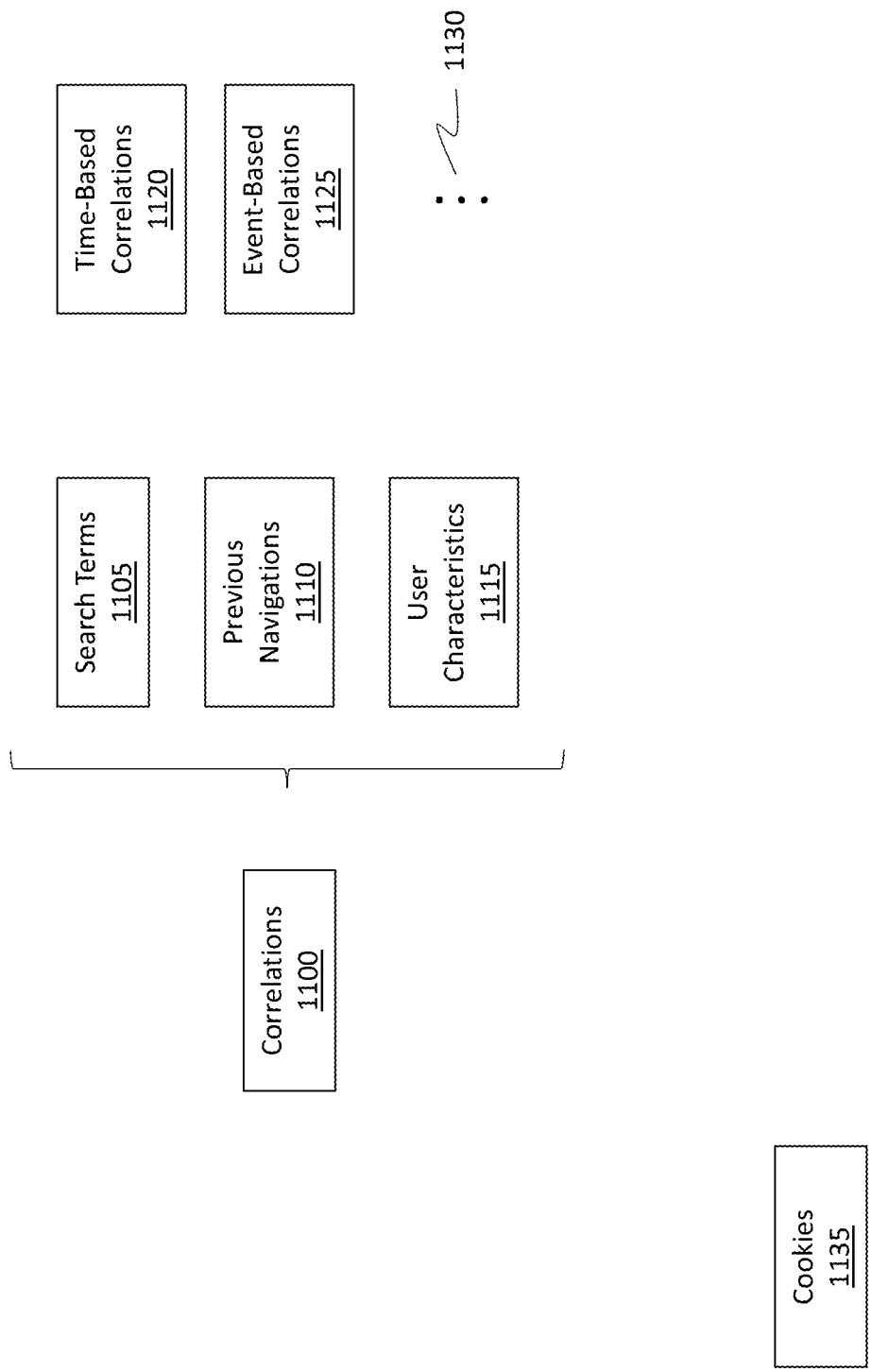
FIG. 11 illustrates various correlations that can be identified between a user and previous users.

FIG. 10 shows how the ML engine 1005 is able to identify correlations 1025 based on the user's search terms and previous navigations 1030 performed by other users across various webpages 1035. FIG. 11 provides some additional details regarding these correlations.

FIG. 11 shows a set of correlations 1100, which are representative of the correlations 1025 that are identified by the ML engine 1005. The correlations 1100 can include associations between the user's current search terms 1105 and previous search terms, the user's current navigations and previous navigations 1110, the user characteristics 1115 and other users' characteristics, time-based correlations 1120 (e.g., searches that appear to be based on seasonal events), or other event-based correlations 1125 (e.g., perhaps a music concert is occurring, and a search is correlated to that concert). The ellipsis 1130 indicates how other correlations can be identified. In some instances, information from computer cookies 1135 can be obtained and analyzed in an attempt to identify correlations.

Returning to FIG. 9, act 915 includes generating a set of search results based on the one or more search terms and further based on a set of correlations identified by the trained ML algorithm. By way of further illustration, FIG. 10 shows how the ML engine 1005 is able to generate a set of search results 1040 based on the initial set of search terms. These search results 1040 are generated in an effort to connect the user with a particular desired end result, which is determined based on the correlations that exist between this user and other users.

In some cases, the set of search results are generated based on time-based correlations between a season (e.g., Fall, Winter, Spring, Summer, baseball season, football season, etc.) during which the search terms were entered and seasons in which previously learned search sessions occurred. In some cases, the set of search results are generated based on event-based correlations between an event (e.g., a sporting event, a party, a concert, etc.) during which the search terms were entered and events in which the previously learned search sessions occurred.

As the user continues his/her search, the ML engine 1005 acquires new data 1045, such as new search terms or new navigations/routes. For instance, the new data 1045 collected during a search session can include navigations to different webpages. Optionally, the new data that is collected during the search session can include (i) a user selection of a particular hyperlink and/or (ii) an entry of new search terms. The new data can also include interactions the user has with a webpage, such as the cursor speed, cursor clicks, cursor location or position, a time spent on a webpage, and so on. The ML engine 1005 can process this new information to provide new search results 1050, which are refined based on the new data 1045.

Based on new data collected during the new search session, act 920 includes causing the ML algorithm to further generate search results that are generated based on one or more new correlations that are identified by the trained ML algorithm. In this sense, the ML algorithm can repeatedly learn and adapt over time to provide relevant search results. Optionally, method 900 can further include detecting a search terminating event for the search session.

The search results 1040 and/or the search results 1050 can be generated based on an evaluation of the dynamic scores that were generated for the previously learned search sessions. For instance, a particular route or end result might be associated with a high dynamic score, indicating that this current user is likely looking for the end result associated with that high dynamic score. As a result, the embodiments can display that end result early in the search session (e.g., in response to the initial set of search terms being searched).

Accordingly, the disclosed embodiments are configured to help users find end results (e.g., perhaps specific products or information) in an easier manner. A specific example may be helpful.

Suppose a customer named Tom goes to a particular webpage (e.g., Dell.com) to look for a personal laptop. His priorities for the personal laptop are fast speed and lightweight. He would also like to find a laptop that could fulfill his occasional gaming desires.

Tom's background information (e.g., name, id, gender, age, profession, etc.) can be captured when he enters Dell.com via the ML engine. Tom clicks into the search bar and types in "lightweight laptops." This click's timestamp information will be captured and marked as the beginning of a new search session. Tom then clicks around on the webpage looking at different laptops. Tom browses the current webpage and looks at other webpages as well. For instance, Tom scrolls through different product pages, and the ML engine is able to capture all of these user interactions.

Tom then clicks the search box to expand his search to include "gaming" in the keyword. This new search allows him to review new search results that not only meet with his lightweight laptops needs but also meet his occasional gaming desires.

All the above search results and the items being showed to the users are calculated based on the ML engine on the backend. As an example, the previous historical search routes of Tom's type of customer group have a search route dynamic score of 60 (based on all the datapoints and calculations). Thus, when Tom enters the webpage, the ML engine understands him already and will be able to predict how likely is his search going to lead to a successful purchase with the search term that Tom enters. The ML engine will then provide the search results to improve the search-to-purchase success rate based on all the historical search routes analysis and clustering analysis that happens at the backend. The ML engine can be configured to pick the highest search-to-purchase search route and to present that route to Tom. In this way, Tom is going through the entire search and browsing process based on what the ML engine predicts and will be more likely to find what he is looking for right away.

Example Architectures and Computer Systems

The following is a discussion of aspects of example operating environments for various embodiments of the invention. This discussion is not intended to limit the scope of the invention, or the applicability of the embodiments, in any way. One will appreciate how the disclosed operations can be performed using these operating environments.

In general, embodiments of the invention may be implemented in connection with systems, software, and components, that individually and/or collectively implement, and/or cause the implementation of, data protection operations which may include, but are not limited to, data replication operations, 10 replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term "data" or "network packet" is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 12:
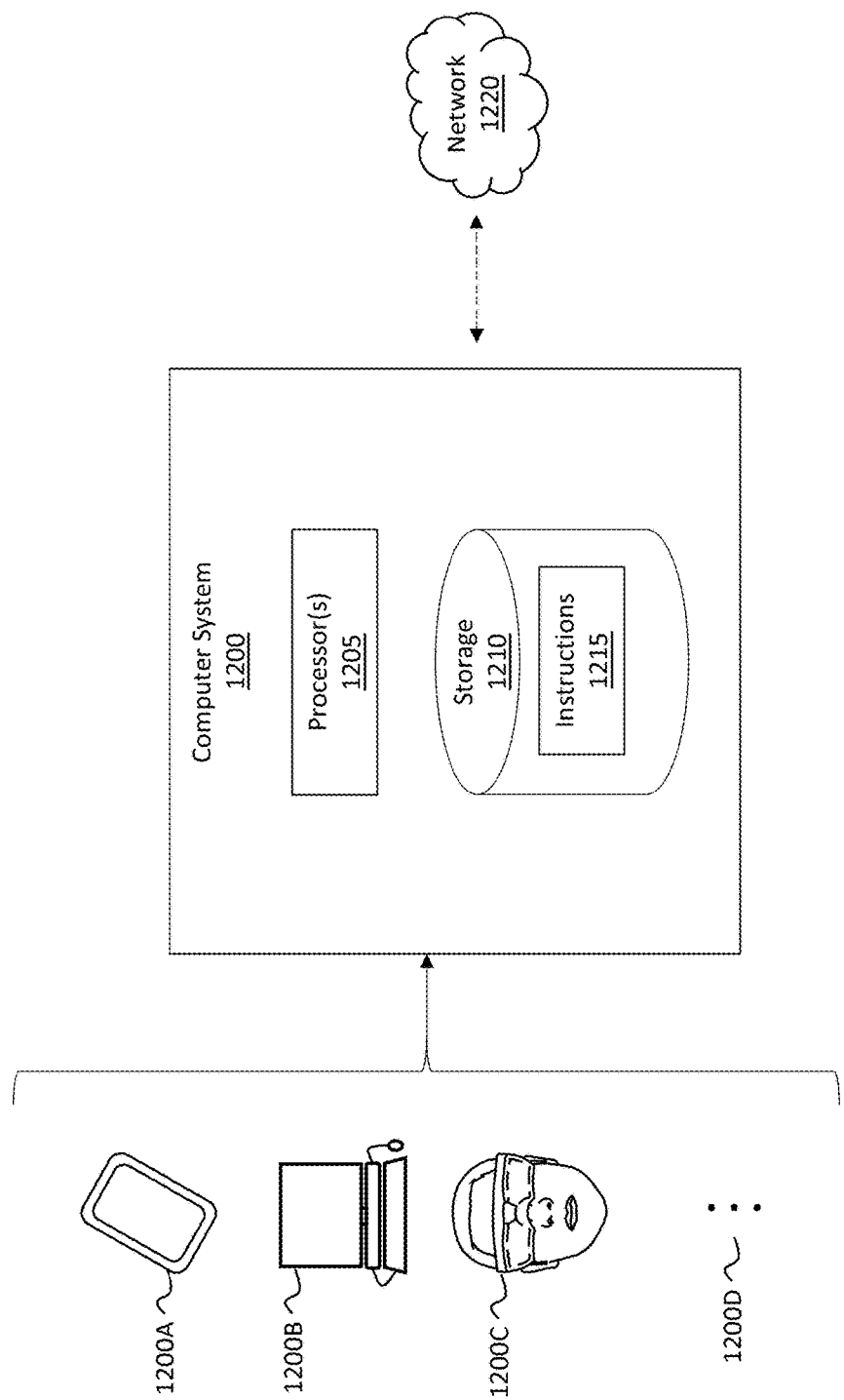
FIG. 12 illustrates an example computer system configured to perform any of the disclosed operations.

With particular attention now to FIG. 12, one example of a computer system 1200 is disclosed. Computer system 1200 may include and/or be used to perform any of the operations described herein, including method 300 of FIG. 3 and method 900 of FIG. 9. Computer system 1200 may take various different forms. For example, computer system 1200 may be embodied as a tablet 1200A, a desktop or a laptop 1200B, a wearable device 1200C, a mobile device, or any other standalone device, as represented by the ellipsis 1200D. Computer system 1200 may also be a distributed system that includes one or more connected computing components/devices that are in communication with computer system 1200.

In its most basic configuration, computer system 1200 includes various different components. FIG. 12 shows that computer system 1200 includes one or more processor(s) 1205 (aka a "hardware processing unit") and storage 1210.

Regarding the processor(s) 1205, it will be appreciated that the functionality described herein can be performed, at least in part, by one or more hardware logic components (e.g., the processor(s) 1205). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1200. The different components, modules, engines, and services described herein may be implemented as objects or processors that execute on computer system 1200 (e.g. as separate threads).

Storage 1210 may be physical system memory, which may be volatile, non-volatile, or some combination of the two. The term "memory" may also be used herein to refer to non-volatile mass storage such as physical storage media. If computer system 1200 is distributed, the processing, memory, and/or storage capability may be distributed as well.

Storage 1210 is shown as including executable instructions 1215. The executable instructions 1215 represent instructions that are executable by the processor(s) 1205 of computer system 1200 to perform the disclosed operations, such as those described in the various methods.

The disclosed embodiments may comprise or utilize a special-purpose or general-purpose computer including computer hardware, such as, for example, one or more processors (such as processor(s) 1205) and system memory (such as storage 1210), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1200 may also be connected (via a wired or wireless connection) to external sensors (e.g., one or more remote cameras) or devices via a network 1220. For example, computer system 1200 can communicate with any number devices or cloud services to obtain or process data. In some cases, network 1220 may itself be a cloud network. Furthermore, computer system 1200 may also be connected through one or more wired or wireless networks to remote/separate computer systems(s) that are configured to perform any of the processing described with regard to computer system 1200.

A "network," like network 1220, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1200 will include one or more communication channels that are used to communicate with the network 1220. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A training method for training a machine learning (ML) algorithm (i) to identify a search starting event and a search terminating event for a search session, where the search session includes multiple navigations across multiple different webpages, and (ii) to derive a dynamic score for the search session, where the dynamic score reflects whether the search session successfully identified an end result that was initially unknown at a time when the search starting event occurred, said training method comprising:

causing an ML algorithm to identify a search starting event for a search session, wherein the search starting event is identified (i) based on a detection of one or more search terms being entered in a browser to facilitate execution of an initial search or (ii) based on the execution of the initial search, and wherein a webpage is displayed in the browser in response to the execution of the initial search;

after the webpage is displayed, causing the ML algorithm to track intermediary events that include multiple navigations to multiple different webpages, wherein a determination is made that the intermediary events are related to the initial search despite the navigations to the multiple different webpages, such that the search session is configured to include the webpage resulting from the initial search as well as the multiple different webpages resulting from the multiple navigations;

after the intermediary events are tracked, causing the ML algorithm to identify a search terminating event for the search session;

causing the ML algorithm to identify a navigation route that was generated between a time when the search starting event occurred and a time when the search terminating event occurred, wherein the navigation route includes the multiple navigations to the multiple different webpages;

causing the ML algorithm to determine an outcome of the search session; and based on the determined outcome, causing the ML algorithm to derive a dynamic score for the navigation route of the search session, wherein the dynamic score reflects a quantitative confidence as to whether the search session resulted in successful identification of an end result that was initially unknown at the time when the search starting event occurred.

2. The method of claim 1, wherein the multiple navigations to the multiple different webpages includes navigations to webpages having different domains.

3. The method of claim 1, wherein the intermediary events are determined to be related to the initial search based on one or more of the following conditions:

a hyperlink in the webpage is selected and said selection results in a different webpage being displayed; or subsequent search terms that are used during subsequent searches include one or more common search terms that were included in the one or more search terms that were originally entered in the browser to facilitate the initial search.

4. The method of claim 1, wherein identifying the search terminating event for the search session includes identifying one or more of the following:

a scrolling speed used while a particular webpage is being displayed; or an amount of time that the particular webpage is being displayed; or a location of a cursor relative to the particular webpage; or an event in which the particular webpage is shared; or an event in which a product displayed in the particular webpage is purchased; or an event in which text that is displayed in the particular webpage is copied; or an event in which the browser is closed.

5. The method of claim 1, wherein the ML algorithm further learns characteristics of a user conducting the search session.

6. The method of claim 1, wherein the ML algorithm learns on multiple search sessions, and wherein the ML algorithm performs a clustering process to generate a map that identifies relationships between attributes of the multiple search sessions.

7. The method of claim 1, wherein the search terminating event is identified based on micro-feedback received from a user who is conducting the search session.

8. A method for using a trained machine learning (ML) algorithm that has been trained to identify correlations between a new search session and previously learned search sessions in order to provide refined search results for the new search session, where the refined search results are designed in an attempt to reduce a number of webpage navigations that will potentially be performed during the new search session and where the refined search results are generated based on webpage navigations that were tracked as parts of the previously learned search sessions, said method comprising:

detecting a search starting event for the new search session, wherein the search starting event is identified (i) based on a detection of one or more search terms being entered in a browser to facilitate execution of an initial search or (ii) based on the execution of the initial search;

causing the trained ML algorithm to attempt to identify correlations between (i) the one or more search terms and (ii) one or more previous navigations between various webpages, where the one or more previous navigations were tracked as parts of the previously learned search sessions;

generating a set of search results based on the one or more search terms and further based on a correlation identified by the trained ML algorithm; and based on new data collected during the new search session, causing the ML algorithm to further generate search results that are generated based on one or more new correlations that are identified by the trained ML algorithm.

9. The method of claim 8, wherein the set of search results are generated based on correlations between characteristics of a user who entered the one or more search terms and characteristics of previous users who facilitated the previously learned search sessions.

10. The method of claim 8, wherein the new data collected during the new search session includes navigations to different webpages.

11. The method of claim 8, wherein said method further includes detecting a search terminating event for the new search session.

12. The method of claim 8, wherein the set of search results are generated based on time-based correlations between a season during which the one or more search terms were entered and seasons in which the previously learned search sessions occurred.

13. The method of claim 8, wherein the set of search results are generated based on event-based correlations between an event during which the one or more search terms were entered and events in which the previously learned search sessions occurred.

14. The method of claim 8, wherein the new data that is collected during the new search session includes (i) a user selection of a particular hyperlink or (ii) an entry of new search terms.

15. The method of claim 8, wherein the ML algorithm collects additional data during the new search session, the additional data comprising one or more of: search term categories, customer identification information, customer gender information, customer age information, customer profession information, or customer budget information, and wherein the ML algorithm further attempts to identify correlations between the additional data and data included in the previously learned search sessions.

16. The method of claim 8, wherein the ML algorithm collects additional data during the new search session, the additional data comprising one or more of: a scrolling speed, a number of clicks, a time spent on a webpage, or a cursor position.

17. A method for using a trained machine learning (ML) algorithm that has been trained to identify correlations between a new search session and previously learned search sessions in order to provide refined search results for the new search session, where the refined search results are designed in an attempt to reduce a number of webpage navigations that will potentially be performed during the new search session and where the refined search results are generated based on webpage navigations that were tracked as parts of the previously learned search sessions, said method comprising:

- detecting a search starting event for the new search session, wherein the search starting event is identified (i) based on a detection of one or more search terms being entered in a browser to facilitate execution of an initial search or (ii) based on the execution of the initial search;
- causing the trained ML algorithm to attempt to identify correlations, wherein the correlations include correlations between (i) the one or more search terms and (ii) one or more previous navigations between various webpages, where the one or more previous navigations were tracked as parts of the previously learned search sessions, and wherein the correlations include correlations between characteristics of a user who is conducting the new search session and characteristics of users who conducted the previously learned search sessions;
- generating a set of search results based on the one or more search terms and further based on a set of correlations identified by the trained ML algorithm; and
- based on new data collected during the new search session, causing the ML algorithm to further generate search results that are generated based on one or more new correlations that are identified by the trained ML algorithm.

18. The method of claim 17, wherein the set of search results are further generated based on an evaluation of dynamic scores that were generated for the previously learned search sessions.

19. The method of claim 17, wherein the user who is conducting the new search session is initially an anonymous user.

20. The method of claim 19, wherein browser cookies are examined to identify the correlations between the characteristics of the user who is conducting the new search session and the characteristics of the users who conducted the previously learned search sessions.

* * * * *